US009827937B2

(12) United States Patent
Hayashi

(10) Patent No.: US 9,827,937 B2
(45) Date of Patent: Nov. 28, 2017

(54) AIRBAG CONTROL DEVICE AND SEMICONDUCTOR DEVICE

(71) Applicant: Renesas Electronics Corporation, Tokyo (JP)

(72) Inventor: Yutaka Hayashi, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 3 days.

(21) Appl. No.: 15/167,641

(22) Filed: May 27, 2016

(65) Prior Publication Data

US 2016/0362078 A1 Dec. 15, 2016

(30) Foreign Application Priority Data

Jun. 11, 2015 (JP) ................................. 2015-117955

(51) Int. Cl.
*B60R 21/017* (2006.01)
*H02M 3/07* (2006.01)
*H02M 3/156* (2006.01)
*H02J 7/34* (2006.01)

(52) U.S. Cl.
CPC .............. *B60R 21/017* (2013.01); *H02J 7/34* (2013.01); *H02M 3/07* (2013.01); *H02M 3/156* (2013.01)

(58) Field of Classification Search
CPC ......... B60R 21/017; B60R 2021/01286; H02J 7/34; H02M 3/07; H02M 3/156
See application file for complete search history.

(56) References Cited

U.S. PATENT DOCUMENTS

| 2008/0164760 A1* | 7/2008 | Hattori | ................... | H02J 9/061 307/64 |
| 2011/0012568 A1* | 1/2011 | Schumacher | ......... | B60R 21/017 320/166 |
| 2013/0106179 A1* | 5/2013 | Sievers | ................. | B60R 21/017 307/9.1 |

FOREIGN PATENT DOCUMENTS

| JP | 2004-284379 A | 10/2004 |
| JP | 2009-241764 A | 10/2009 |

* cited by examiner

*Primary Examiner* — Jerrah Edwards
*Assistant Examiner* — Mathew F Gordon
(74) *Attorney, Agent, or Firm* — McGinn IP Law Group, PLLC

(57) ABSTRACT

An ECU includes a boosting circuit that boosts an input power supply voltage, a backup capacitor that charges a backup power supply in accordance with a boosted voltage boosted by the boosting circuit, an airbag ignition circuit that drives an airbag with the backup power supply charged by the backup capacitor as a driving power supply, and a bidirectional current limiting unit that limits a charging current flowing from the boosting circuit to the backup capacitor and limits a backflow current flowing from the backup capacitor to the boosting circuit.

20 Claims, 15 Drawing Sheets

AIRBAG CONTROL DEVICE AND SEMICONDUCTOR DEVICE

CROSS-REFERENCE TO RELATED APPLICATIONS

This application is based upon and claims the benefit of priority from Japanese patent application No. 2015-117955, filed on Jun. 11, 2015, the disclosure of which is incorporated herein in its entirety by reference.

BACKGROUND

The present invention relates to an airbag control device and a semiconductor device, and it is suitably applicable to an airbag control device and a semiconductor device for driving an airbag, for example.

Airbags to ensure the safety of passengers in the event of a vehicle crash are used. For example, airbag systems for driving airbags as disclosed in Japanese Unexamined Patent Publications Nos. 2009-241764 and 2004-284379 include an ECU (Electrical Control Unit) for controlling a sensor and an airbag. When the sensor detects a crash of a vehicle, the ECU drives the airbag to deploy the airbag.

To enhance the safety, an airbag is located inside a steering wheel, a dashboard, a side window or the like today, and a technique that reliably drives the airbag in the event of a vehicle crash is desired.

SUMMARY

In the event of a vehicle crash, there is a possibility that a line for supplying power from a battery to an airbag control ECU is cut off. Thus, the ECU is equipped with a backup capacitor for backup of the power supply. In the event of a vehicle crash, by discharging the charge in the backup capacitor and supplying the power for driving the airbag, it is possible to drive the airbag even when the power supply from the battery is cut off.

In view of the above, a problem of one embodiment of the present invention is to drive an airbag more reliably. The other problems and novel features of the present invention will become apparent from the description of the specification and the accompanying drawings.

According to one embodiment, an airbag control device includes a boosting circuit, a backup capacitor, an airbag driving circuit, and a current limiting circuit. The boosting circuit boosts an input power supply voltage, the backup capacitor charges a backup power supply in accordance with a boosted voltage boosted by the boosting circuit, the airbag driving circuit drives an airbag with the backup power supply charged by the backup capacitor as a driving power supply. Further, the current limiting circuit limits a charging current flowing from the boosting circuit to the backup capacitor and limits a backflow current flowing from the backup capacitor to the boosting circuit.

According to the above-described embodiment, it is possible to drive an airbag more reliably.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
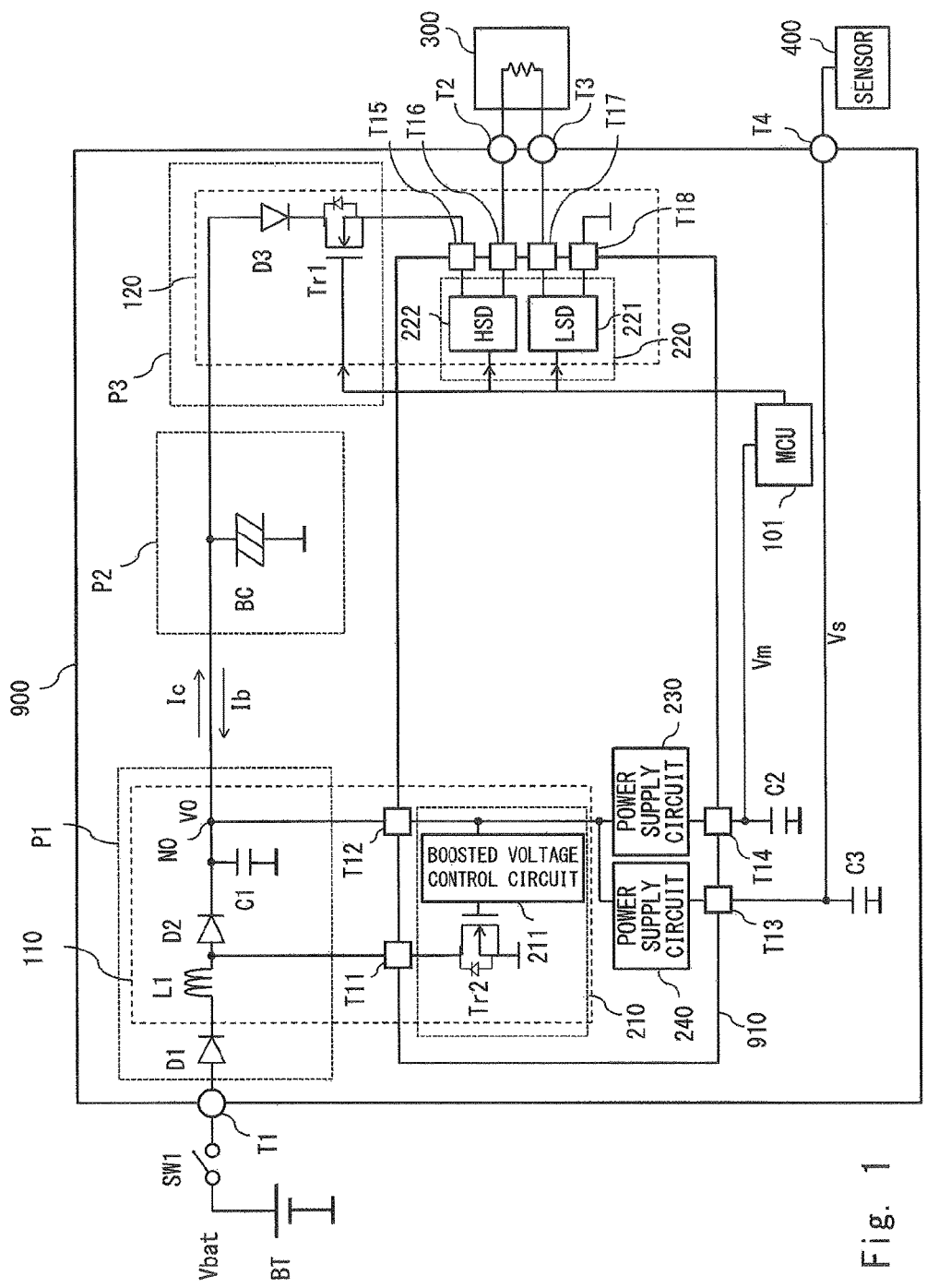
FIG. 1 is a block diagram showing the configuration of an airbag system according to a reference example 1.

The following description and the attached drawings are appropriately shortened and simplified to clarify the explanation. Further, elements that are shown as functional blocks for performing various kinds of processing in the drawings may be configured by a CPU, memory or another circuit as hardware or may be implemented by a program loaded to memory or the like as software. It would be thus obvious to those skilled in the art that those functional blocks may be implemented in various forms such as hardware only, software only or a combination of those, and not limited to either one. Note that, in the drawings, the same elements are denoted by the same reference symbols and redundant description thereof is omitted as appropriate.

Studies Before Reaching Embodiment

In an in-vehicle airbag system, after an ignition is turned on, a backup capacitor is charged by a boosting circuit, and further an MCU (Micro Controller Unit) communicates with a sensor to make a diagnosis of the system at the same time. In order to make the diagnosis promptly, such as in 1 second, for example, it is necessary to activate the output of the boosting circuit, which serves as the power supply of the MCU and the sensor, in a short time. Further, the backup capacitor is charged in several seconds after activation, and accumulates the charge so as to drive the airbag system for a certain period of time even when the power supply from a battery is cut off in the event of a vehicle crash.

The reference examples 1 and 2 before an embodiment is applied, which include an airbag control ECU equipped with a backup capacitor, are studied below. The reference example 1 is an example where a charging current to the backup capacitor is not limited, and the reference example 2 is an example where a charging current to the backup capacitor is limited.

Figure 2:
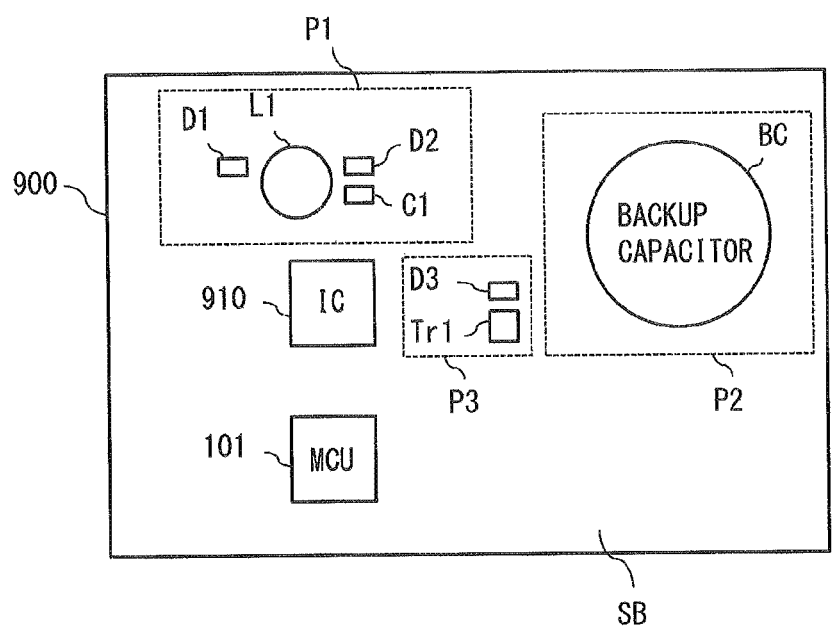
FIG. 2 is an assembly diagram showing the assembly image of an ECU according to the reference example 1.

FIG. 1 shows the configuration of an airbag system that includes the ECU according to the reference example 1, and FIG. 2 shows the assembly image of main parts in the ECU according to the reference example 1. As shown in FIG. 1, the airbag system according to the reference example 1 includes an ECU 900, a battery BT that is connected to the ECU 900 through an ignition switch SW1, an airbag 300 and a sensor 400 that are connected to the ECU 900.

The ECU 900 according to the reference example 1 includes parts P1 to P3, an IC 910, an MCU 101, and capacitors C2 and C3. The part P1 includes a diode D1, an inductor L1, a diode D2, and a capacitor C1. The part P2 includes a backup capacitor BC. The part P3 includes a diode D3 and a transistor Tr1. As shown in the assembly image of FIG. 2, in the ECU 900 according to the reference example 1, the parts P1 to P3, the IC 910 and the MCU 101 are assembled on a printed circuit board SB.

Further, as shown in FIG. 1, the IC 910 includes a boosted voltage control unit 210, an airbag driving unit 220, and power supply circuits 230 and 240. The boosted voltage control unit 210 includes a transistor Tr2 and a boosted voltage control circuit 211, and the airbag driving unit 220 includes an LSD (low-side driver) 221 and an HSD (high-side driver) 222. The inductor L1, the diode D2, the capacitor C1, the transistor Tr2 and the boosted voltage control circuit 211 constitute a boosting circuit 110. The diode D3, the transistor Tr1, the LSD 221 and the HSD 222 constitute an airbag ignition circuit 120.

A power supply voltage Vbat is supplied from the battery BT to the boosting circuit 110 through the ignition switch SW1 and the diode D1 for backflow prevention. The boosting circuit 110 boosts the power supply voltage Vbat, and supplies a boosted voltage V0 as power to the power supply circuit 230 for MCU, the power supply circuit 240 for sensor, the backup capacitor BC and the airbag ignition circuit 120. The backup capacitor BC accumulates the charge so that the airbag system can operate for a certain period of time even when the power supply from the battery BT is cut off in the event of a vehicle crash. When the ignition switch SW1 is turned on, a charging current Ic flows from a node N0 of the boosting circuit 110 to the backup capacitor BC, and the backup capacitor BC is thereby charged. When the power supply from the battery BT is cut off, a backflow current (backup current) Ib flows from the backup capacitor BC to the node N0 and is supplied as power from the backup capacitor BC.

The power supply circuit 230 for MCU generates a voltage Vm, which is power for MCU, from a voltage V0 that is stabilized by the capacitor C1 for smoothing in the boosting circuit 110. The MCU 101 operates with the voltage Vm that is supplied from the power supply circuit 230 and controls the airbag ignition circuit 120. In the airbag ignition circuit 120, when the transistor Tr1, the HSD 222 and the LSD 221 are turned on at the same time by the control of the MCU 101, an ignition current flows from the backup capacitor BC to the airbag 300 through the diode D3 for backflow prevention, and the airbag 300 is deployed. The power supply circuit 240 for sensor generates a voltage Vs, which is power for sensor, from the voltage V0 that is stabilized by the capacitor C1 for smoothing in the boosting circuit 110. The sensor 400 operates with the voltage Vs that is supplied from the power supply circuit 240 and senses vehicle crash information.

A plurality of airbags 300 can be connected to the ECU 900, and a plurality of airbag ignition circuits 120 can be placed corresponding to the respective airbags 300. The capacity of the backup capacitor BC increases with the number of the airbags 300 and airbag ignition circuits 120. For example, in the ECU 900 according to the reference example 1, a large backup capacitor BC with several mF is directly connected to the node N0 of the boosting circuit 110. By the voltage V0 of the node N0, power is supplied to the MCU 101 and further the backup capacitor BC is charged, and therefore, when the MCU 101 makes a diagnosis of the system in a short time, it is necessary to charge the backup capacitor BC at the same time. Thus, as shown in FIG. 2, the boosting circuit 110 and the part P1 (the diode D1, the inductor L1, the diode D2, and the capacitor C1) included therein require a large current capacity, and the size of the part P1 increases, thus having a problem that the part P1 cannot be reduced in size.

Figure 3:
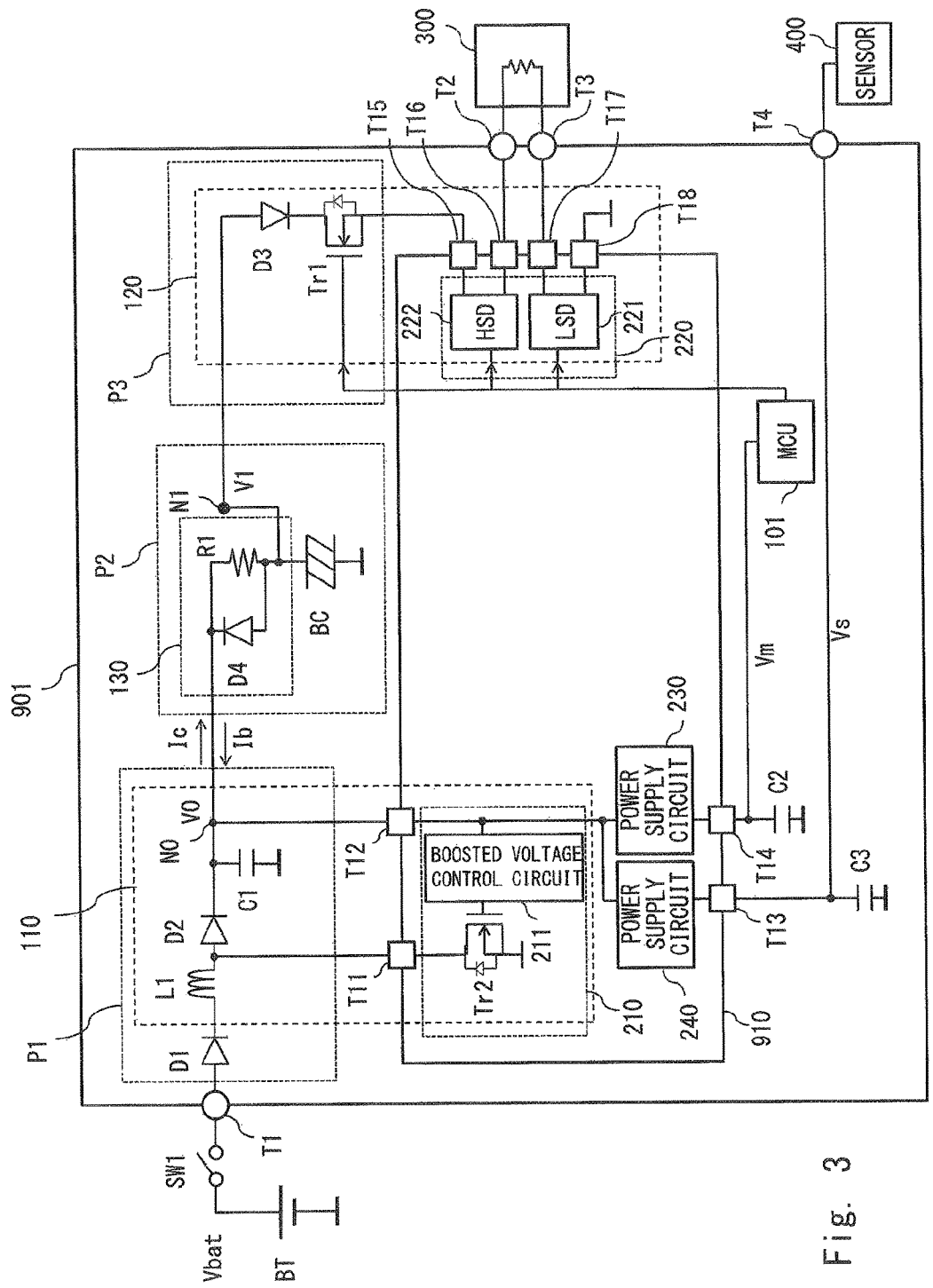
FIG. 3 is a block diagram showing the configuration of an airbag system according to a reference example 2.
Figure 4:
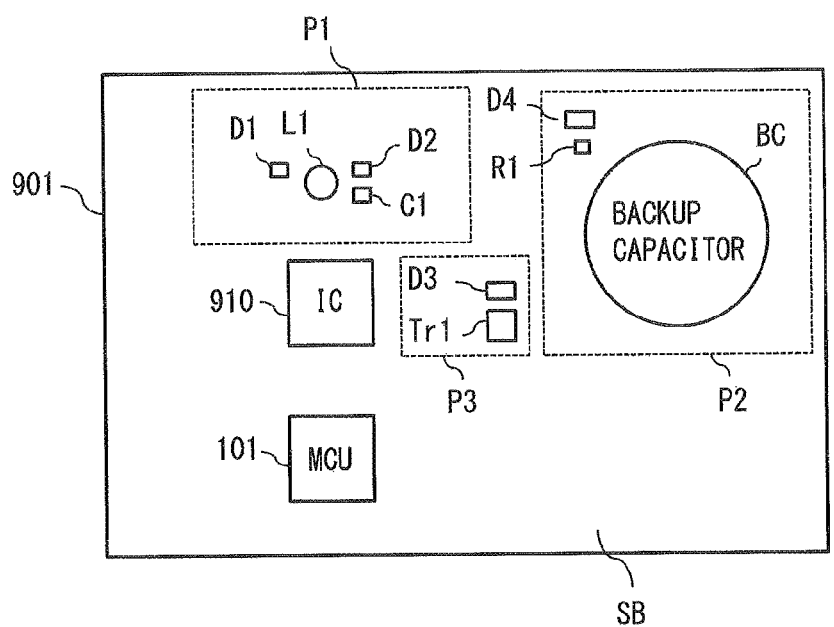
FIG. 4 is an assembly diagram showing the assembly image of an ECU according to the reference example 2.

FIG. 3 shows the configuration of an airbag system that includes the ECU according to the reference example 2, and FIG. 4 shows the assembly image of main parts in the ECU according to the reference example 2. As shown in FIGS. 3 and 4, an ECU 901 according to the reference example 2 includes a diode D4 and a resistor R1 as the part P2 in addition to the elements of the reference example 1 shown in FIGS. 1 and 2.

In the reference example 2, the resistor R1 is connected between the backup capacitor BC and the node N0 of the boosting circuit 110 to limit the charging current Ic. Further, the resistor R1 for charging current limitation and the diode D4 are connected in parallel, and, when the battery power supply is cut off, power is supplied to the airbag ignition circuit 120, and a backflow current Ib flows through the diode D4 to supply power to the power supply circuit 230 for MCU and the power supply circuit 240 for sensor. The resistor R1 and the diode D4 constitute a current limiting unit 130 that limits the charging current Ic to the backup capacitor BC.

Figure 5:
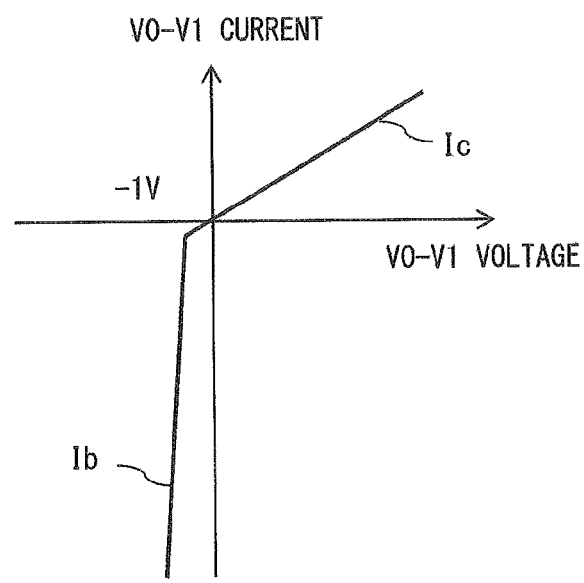
FIG. 5 is a characteristic diagram showing the current-voltage characteristics of a current limiting unit according to the reference example 2.

FIG. 5 shows the current-voltage characteristics of the current limiting unit 130 according to the reference example 2, which are the characteristics of the charging current to the backup capacitor BC and the backflow current.

In the current limiting unit 130 according to the reference example 2, when the boosting circuit 110 is activated, and the boosted voltage V0 becomes higher, the charging current Ic flows from the node N0 to the backup capacitor BC through the resistor R1. Because the backup capacitor BC is charged by the charging current Ic, the voltage V1 of the backup capacitor BC increases. At this time, the charging current Ic (the current between V0 and V1 on the positive side) that flows to the backup capacitor BC has the characteristics with the slope of the resistor R1, and the current increases as the V0−V1 voltage increases and decreases as the V0−V1 voltage decreases.

Further, in the current limiting unit 130 according to the reference example 2, when the power supply from the battery BT is cut off, the voltage V0 decreases, and the backflow current (backup current) Ib flows from the backup capacitor BC to the node N0 through the diode D4. At this time, the backflow current (the current between V0 and V1 on the negative side) Ib that flows from the backup capacitor BC abruptly increases (to the negative side) when exceeding a threshold of the diode D4 (for example, VF=1V).

Because the ECU 901 according to the reference example 2 includes the resistor R1 in the current limiting unit 130, the charging current to the backup capacitor BC is limited, and the part P1 of the boosting circuit 110 can be reduced in size as shown in FIG. 4. However, in the case where a short-circuit fault of the capacitor C1 for smoothing in the boosting circuit 110 or a GND (ground) short-circuit fault in the IC 910 occurs, a very large backflow current flows from the backup capacitor BC through the diode D4 for backup, and the diode D4 with a large current capacity is required, thus having a problem that the size of the diode D4 increases and is difficult to be reduced. Thus, the current limiting unit cannot be incorporated into the IC because the diode D4 is large in size.

First Embodiment

A first embodiment is described hereinafter with reference to the drawings.

Configuration of First Embodiment

Figure 6:
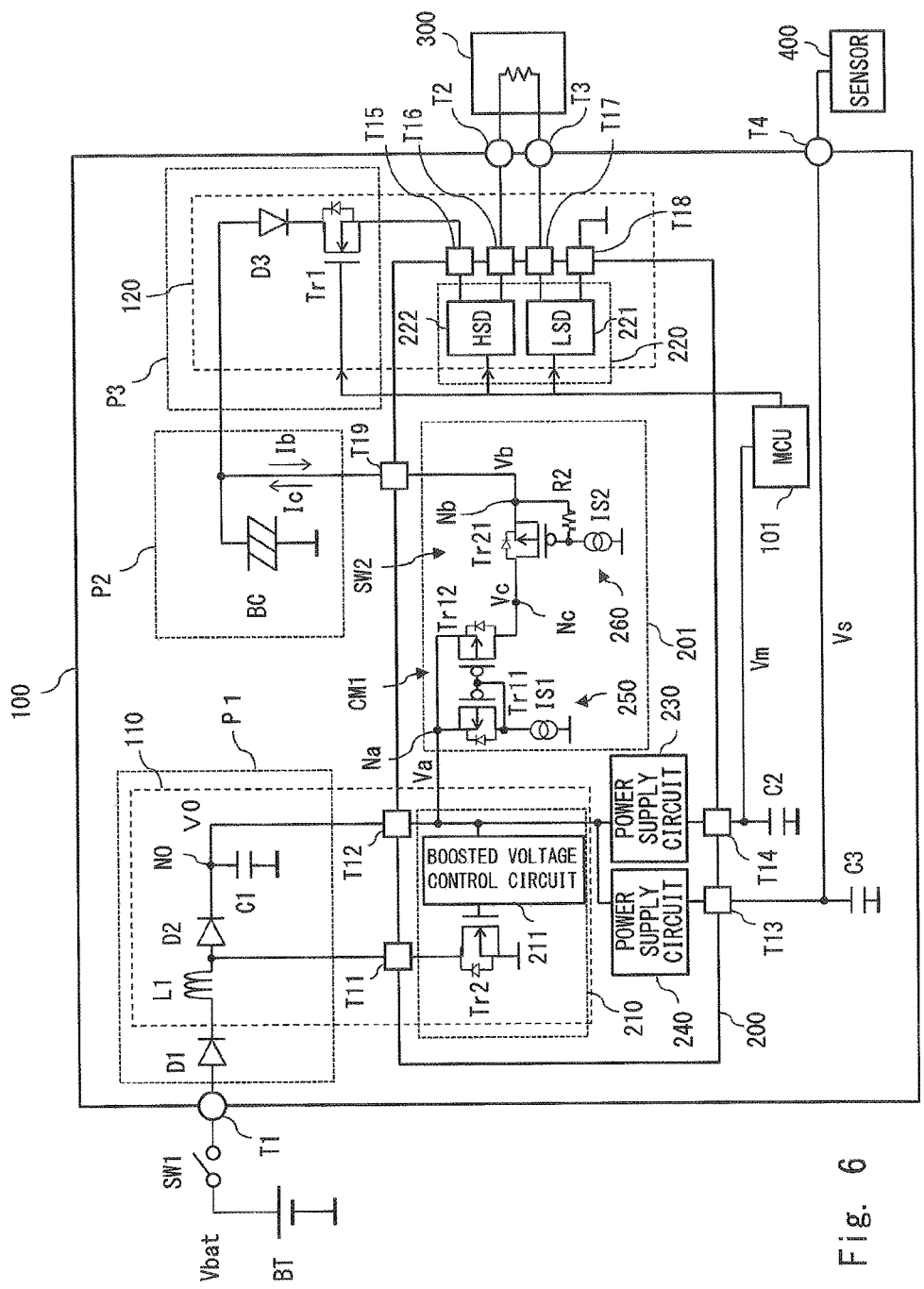
FIG. 6 is a block diagram showing the configuration of an airbag system according to a first embodiment.
Figure 7:
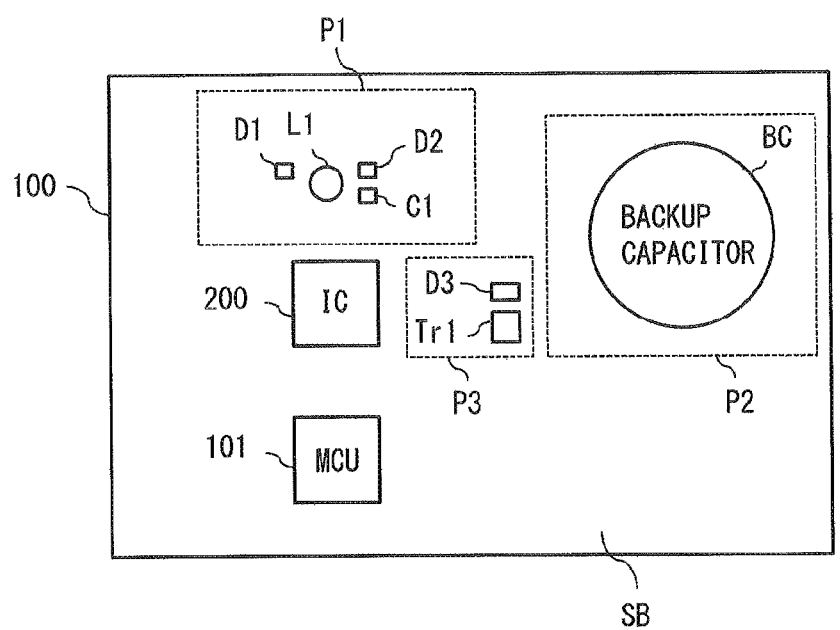
FIG. 7 is an assembly diagram showing the assembly image of an ECU according to the first embodiment.

FIG. 6 shows the configuration of an airbag system that includes an ECU according to an embodiment, and FIG. 7 shows the assembly image of main parts in the ECU according to this embodiment.

As shown in FIG. 6, in an ECU 100 according to an embodiment, an IC 200 includes a bidirectional current limiting unit 201, which is different from the reference example 1. Specifically, the ECU (airbag control device) 100 according to this embodiment mainly includes a boosting circuit 110, a backup capacitor BC, and a bidirectional current limiting unit (current limiting circuit) 201, and further includes an airbag ignition circuit (airbag driving circuit) 120.

The ECU 100 according to this embodiment includes parts P1 to P3, an MCU 101, and capacitors C2 and C3, which are the same as in the reference example 1, and also includes the IC 200 according to this embodiment. Further, as shown in FIG. 7, in the ECU 100 according to this embodiment, the parts P1 to P3, the IC 200 according to this embodiment, and the MCU 101 are assembled on a printed circuit board SB in the same manner as in the reference example 1.

As shown in FIG. 6, the ECU 100, a battery BT, an ignition switch SW1, an airbag 300 and a sensor 400 constitute an airbag system (airbag control system) that controls an airbag of a vehicle. The ECU 100 includes terminals T1 to T4, which are external terminals. The battery BT is connected to the terminal T1 through the ignition switch SW1, the airbag (airbag unit) 300 is connected to the terminals T2 and T3, and the sensor 400 is connected to the terminal T4. Note that a plurality of airbags 300 and a plurality of sensors 400 may be connected to the ECU 100.

The sensor 400 is a crash detection unit that detects a crash (impact) of a vehicle, and outputs a detection signal that has detected a crash to the ECU 100. The airbag (airbag unit) 300 includes an ignition device (squib), which is driven (ignited) according to a drive signal (ignition signal) from the ECU 100 to deploy the airbag. The ECU 100 is an airbag control device that controls the driving of the airbag 300 according to a detection signal from the sensor 400.

The MCU (control circuit) 101 controls the operation of the airbag ignition circuit 120. The MCU 101 is connected with the sensor 400 so that signals can be input and output (not shown), determines a vehicle crash based on a detection signal from the sensor 400, and controls the airbag ignition circuit 120 to drive (ignite) the airbag 300. Further, the MCU 101 makes a diagnosis whether the system is normal or not at the time of activation. For example, the MCU 101 makes an inquiry to the sensor 400 and checks whether the sensor 400 operates normally, and further makes an inquiry to the IC 200 and checks whether the voltage of each terminal of the IC 200 is normal. As described later, in this embodiment, a charging current to the backup capacitor is limited to suppress an output load of the boosting circuit 110, and therefore the MCU 101 can operate in a short time from the activation, and it is thereby possible to promptly make a diagnosis.

The IC 200 includes the bidirectional current limiting unit 201 in addition to a boosted voltage control unit 210, an airbag driving unit 220 and power supply circuits 230 and 240 which are the same as in the reference example 1. Specifically, the IC 200 according to this embodiment mainly includes the boosted voltage control unit (boosted voltage control circuit) 210 and the bidirectional current limiting unit 201 and further includes the airbag driving unit 220. The IC 200 includes terminals T11 to T19 that are connected to the respective parts of the ECU.

The boosting circuit 110 is a circuit that boosts an input power supply voltage, and it includes an inductor L1, a diode D2, a capacitor C1, and an transistor Tr2 and a boosted voltage control circuit 211 (boosted voltage control unit 210) in the IC 200 just like in the reference example 1. One end of the inductor L1 is connected to the terminal T1 through the diode D1, and the other end of the inductor L1 is connected to the anode of the diode D2. A node between the inductor L1 and the diode D2 is connected to the terminal Tr2 through the terminal T11 of the IC 200. The terminal T11 is a terminal for inputting a current of the inductor L1. The capacitor C1 is connected between the cathode of the diode D2 and the GND. A node N0 between the diode D2 and the capacitor C1 is connected to the boosted voltage control circuit 211 through the terminal T12 of the IC 200. The terminal T12 is a terminal for connecting a boosting element (for example, the capacitor C1), which is a terminal for inputting a voltage V0 of the node N0, which is a boosted voltage.

For example, the transistor Tr2 is an NMOS transistor, and the drain is connected to the terminal T11, the gate is connected to the boosted voltage control circuit 211, and the source is connected to the GND. The boosted voltage control circuit 211 controls on and off of the transistor Tr2 according to the voltage V0, which is the boosted voltage at the terminal T12 and thereby controls the voltage V0.

When the switching transistor Tr2 turns on, a current from the battery BT flows to the GND through the ignition switch SW1, the diode D1 for backflow prevention, the inductor L1 and the switching transistor Tr2. Then, when the switching transistor Tr2 turns off, a current that has been flowing through the inductor L1 is charged in the capacitor C1 for smoothing through the diode D2. By repeatedly turning on and off the switching transistor Tr2, the capacitor C1 for smoothing is charged, and the charged voltage is output as the boosted voltage.

This charging current satisfies $\Delta I = VL \cdot \Delta t / L$ when an inductance value of the inductor L1 is L, an applied voltage at both ends of the inductor L1 is VL, a current change in a current flowing to the inductor L1 is $\Delta I$, and a time when the voltage VL is applied to the inductor L1 is $\Delta t$, and it increases when the on time becomes longer and decreases when the on time becomes shorter. The boosted voltage control circuit 211 measures the voltage V0, which is the output of the boosting circuit 110, and performs time control in accordance with the voltage and thereby outputs a stable voltage.

The backup capacitor BC is connected between the terminal T19 of the IC 200 and the GND. The backup capacitor BC charges the backup power supply for airbag driving in accordance with the boosted voltage boosted by the boosting circuit 110. The terminal T19 is a terminal for connecting the backup capacitor BC, and it is a terminal for outputting a boosted voltage and charging the backup capacitor BC. The airbag ignition circuit 120 drives the airbag 300 by using the backup power supply that is charged by the backup capacitor BC as a driving power supply. The airbag ignition circuit 120 includes a diode D3, a transistor Tr1, and an LSD 221 and an HSD 222 (airbag driving unit 220) in the IC 200, just like in the reference example 1. The diode D3 and the transistor Tr1 are connected in series to a node between the terminal T19 and the backup capacitor BC. The anode of the diode D3 is connected to the backup capacitor BC and the terminal T19.

For example, the transistor Tr1 is an NMOS transistor, and the drain is connected to the cathode of the diode D3, the gate is connected to the MCU 101, and the source is connected to the HSD 222 through the terminal T15 of the IC 200. The transistor Tr1 supplies the voltage of the backup capacitor BC to the HSD 222 in accordance with control of the MCU 101. The terminal T15 is a terminal for supplying the voltage of the backup capacitor BC (driving power supply for driving the airbag).

In the HSD 222, the input terminal and the output terminal that form a current path from the power supply are connected to the terminal T15 and the terminal T16, and the control terminal is connected to the MCU 101. The high-side terminal of the airbag 300 is connected to the terminal T16 through the terminal T2, and the low-side terminal of the airbag 300 is connected to the terminal T17 through the terminal T3. In the LSD 221, the input terminal and the output terminal that form a current path from the airbag 300 are connected to the terminal T17 and the terminal T18, and the control terminal is connected to the MCU 101. The terminal T16 and the terminal T17 are terminals for connecting the airbag 300 and driving the airbag 300. The terminal T18 is connected to the GND. The HSD 222 and the LSD 221 form a current path that goes from the backup capacitor BC and the transistor Tr1 to the GND through the airbag 300 and drive the airbag 300 in accordance with control of the MCU 101.

The bidirectional current limiting unit 201 limits the charging current Ic from the boosting circuit 110 (terminal T12) to the backup capacitor BC (terminal T19) so that it is smaller than a certain current (first current) and limits the backflow current Ib from the backup capacitor BC (terminal T19) to the boosting circuit 110 (terminal T12) so that it is smaller than a certain current (second current). In this example, the bidirectional current limiting unit 201 includes a charging current limiting unit 250 that limits the charging current Ic and a backflow current limiting unit 260 that limits the backflow current Ib. Note that the bidirectional current limiting unit 201 may be formed in one circuit.

The charging current limiting unit 250 is a constant current circuit that supplies a constant current as the charging current Ic to the backup capacitor BC, and in this embodiment, it is a current mirror circuit CM1 as one example. The current mirror circuit CM1 is connected between the boosting circuit 110 and the backup capacitor BC and limits and supplies the charging current to the backup capacitor BC based on the boosted voltage of the boosting circuit 110. The current mirror circuit CM1 includes PMOS transistors Tr11 and Tr12 and a current source (reference current source) IS1. The PMOS transistor Tr11 is a mirror transistor that generates a reference current of the current mirror, and the PMOS transistor Tr12 is a mirror transistor that generates an output current of the current mirror.

The PMOS transistor Tr11 and the PMOS transistor Tr12 are connected as a current mirror between the boosting circuit 110 and the backflow current limiting unit 260, and the PMOS transistor Tr11 and the current source IS1 are connected in series. The sources of the PMOS transistor Tr11 and the PMOS transistor Tr12 are connected in common, and a common node Na between the sources is connected to the terminal T12. The gates of the PMOS transistor Tr11 and the PMOS transistor Tr12 are connected in common, and a common node between the gates is connected to the drain of the PMOS transistor Tr11. The current source IS1 is connected between the drain of the PMOS transistor Tr11 and the GND. The voltage V0 of the boosted voltage is supplied to the node Na (terminal T12) between the sources of the PMOS transistor Tr11 and the PMOS transistor Tr12, and a constant current is output to a node Nc (backflow current limiting unit 260) to which the drain of the PMOS transistor Tr12 is connected.

The backflow current limiting unit 260 is a constant current circuit that supplies a constant current as the backflow current Ib from the backup capacitor BC, and in this embodiment, it is a switch circuit (switching transistor circuit, transistor circuit) SW2 as one example. The switch circuit SW2 is connected between the current mirror circuit CM1 and the backup capacitor BC, and supplies the backflow current from the backup capacitor BC to the boosting circuit 110, and limits and supplies the backflow current when it is in the saturated state. The switch circuit SW2 includes a PMOS transistor Tr21, a resistor R2 and a current source (reference current source) IS2. The PMOS transistor Tr21 is a switch transistor that performs a switch operation.

The PMOS transistor Tr21 is connected between the charging current limiting unit 250 (node Nc) and the terminal T19 (backup capacitor), and the resistor R2 and the current source IS2 control the state of the PMOS transistor Tr21. In the PMOS transistor Tr21, the drain is connected to the node Nc (drain of the PMOS transistor Tr12), the source is connected to the resistor R2, and a node Nb between the source and the resistor R2 is connected to the terminal T19. The resistor R2 is connected between the gate and the source (terminal T19) of the PMOS transistor Tr21. The current source IS2 is connected between the gate of the PMOS transistor Tr21 and the GND. The current of the current source IS2 flows to the resistor R2, and thereby the PMOS transistor Tr21 is always on. Further, when the boosted voltage V0 decreases and the voltage Vc of the node Nc decreases to be lower than the backup power supply voltage Vb, the PMOS transistor Tr21 becomes saturated, and a charging voltage of the backup capacitor BC is supplied to the node Nb (terminal T19) to which the source of the PMOS transistor Tr21 is connected, and a constant current is output to the node Nc to which the drain of the PMOS transistor Tr21 is connected.

Operation of First Embodiment

The current limiting operation of the bidirectional current limiting unit 201, which is the main feature of this embodiment, is described hereinafter. In this embodiment, the bidirectional current limiting unit 201 that includes the current mirror circuit CM1 and the switch circuit SW2 is connected between the output of the boosting circuit 110 and the backup capacitor BC, and it limits the charging current Ic of the backup capacitor BC and the backflow current Ib from the backup capacitor BC to the output of the boosting circuit 110 which occurs in the event of a ground fault of the output of the boosting circuit 110. Note that the bidirectional current limiting unit 201 is, in other words, a resistor that includes a current limiting means.

Figure 8:
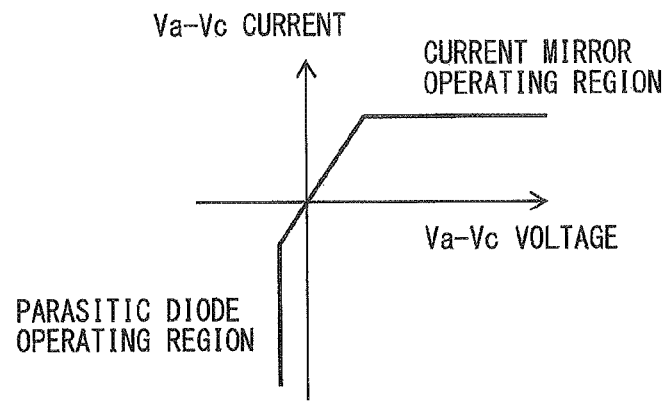
FIG. 8 is a characteristic diagram showing the current-voltage characteristics of a current limiting unit according to the first embodiment.
Figure 9:
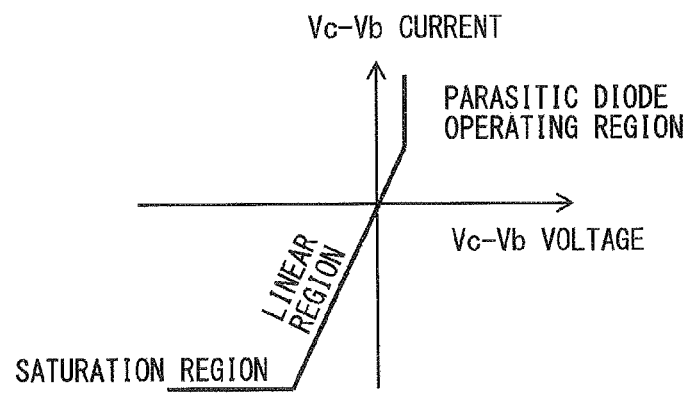
FIG. 9 is a characteristic diagram showing the current-voltage characteristics of a current limiting unit according to the first embodiment.
Figure 10:
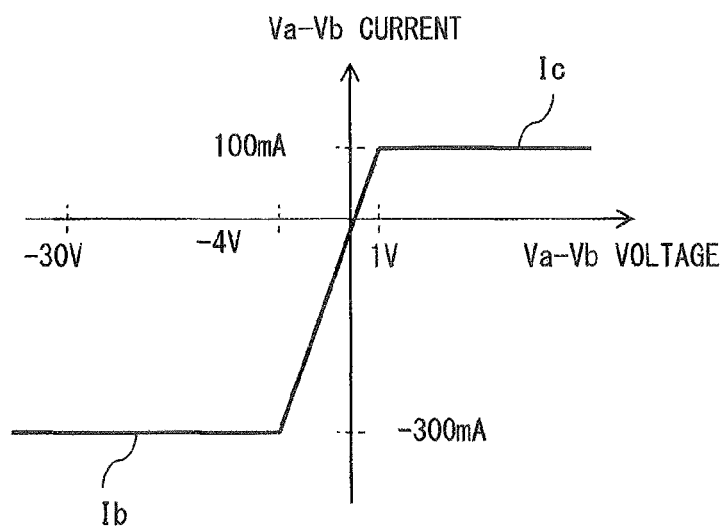
FIG. 10 is a characteristic diagram showing the current-voltage characteristics of a current limiting unit according to the first embodiment.

FIG. 8 shows the current-voltage characteristics of the current mirror circuit CM1, and FIG. 9 shows the current-voltage characteristics of the switch circuit SW2, and FIG. 10 shows the current-voltage characteristics of the bidirectional current limiting unit 201 that combines the current mirror circuit CM1 and the switch circuit SW2.

As shown in FIG. 8, the current mirror circuit CM1 generates a constant current in one direction in accordance with an input-output voltage Va (voltage of the node Na)–Vc (voltage of the node Nc), which is a voltage between input and output. In the current mirror circuit CM1, when the Va–Vc voltage increases, it becomes a current mirror operating region, and the Va–Vc current becomes a constant current by the characteristics of the current mirror, and the charging current Ic to the backup capacitor BC is limited. Note that, in the current mirror circuit CM1, when Va decrease, it becomes the operating region of a parasitic diode of the PMOS transistor Tr12, and the backflow current Ib flows without limitation.

As shown in FIG. 9, the switch circuit SW2 generates a constant current in one direction in accordance with an input-output voltage Vc–Vb (voltage of the node Nb), which is a voltage between input and output. In the switch circuit SW2, when the Vc–Vb voltage increases (to the negative side), it becomes a saturation region by the characteristics of the PMOS transistor, and the Vc–Vb voltage becomes a constant current (to the negative side), and the backflow current Ib from the backup capacitor BC is limited. Specifically, by connecting the source of the PMOS transistor Tr21 to the backup capacitor BC, the drain current of the PMOS transistor Tr21 becomes the saturation region in the event of a ground fault of the output of the boosting circuit 110, and the backflow current Ib can be thereby limited. Note that, in the switch circuit SW2, when Vc increases, it becomes the operating region of a parasitic diode of the PMOS transistor Tr21, and the charging current Ic flows without limitation.

In this embodiment, the characteristics of the bidirectional current limiting unit 201 shown in FIG. 10 are achieved by combining the characteristics of the current mirror circuit CM1 shown in FIG. 8 and the characteristics of the switch circuit SW2 shown in FIG. 9. As shown in FIG. 10, the bidirectional current limiting unit 201 has the characteristics of a resistor when a voltage difference between the voltage Va and the voltage Vb at both ends of the bidirectional current limiting unit 201 is small, and has the characteristics where a current is limited when a voltage difference between the voltage Va and the voltage Vb increases.

When the ignition switch SW1 is turned on, the boosting circuit 110 is activated, and the voltage V0, which is the boosted voltage, increases, and therefore the charging current Ic flows from the boosting circuit 110 to the backup capacitor BC through the bidirectional current limiting unit 201. For example, by limiting the charging current Ic to be a constant current of about 100 mA, the output capacity of the boosting circuit 110 can be reduced, and therefore the part P1 can be reduced in size. Further, by setting the charging current Ic to be constant (100 mA) within 1V from the start of charging by the backup power supply voltage Vb for the output voltage of the boosting circuit 110, the charting time can be maintained stably.

When the power supply from the battery is cut off, the backflow current Ib flows from the backup capacitor BC to the boosting circuit 110 (terminal T12) through the bidirectional current limiting unit 201. The backflow current Ib (backup current) is supplied to the circuit to which the voltage V0 of the terminal T12 is supplied, which is the circuit (power supply circuits 230 and 240) with the current consumption of 200 mA or less, for example, and the current limiting function of a consumed current or more is incorporated as a protection of the transistors Tr21 and Tr12 when the terminal T12 is short-circuited with the GND, thereby achieving the size reduction of the transistors Tr21 and Tr12.

Effects of First Embodiment

As described above, according to this embodiment, because the backup capacitor is included, power can be supplied from the backup capacitor to the airbag driving circuit or the like when the power supply from the battery is cut off, and it is thereby possible to drive the airbag reliably.

Particularly, in this embodiment, the bidirectional current limiting unit that limits currents in both directions is included between the output of the boosting circuit and the backup capacitor. The charging current to the backup capacitor and the backflow current from the backup capacitor to the output of the boosting circuit which occurs in the event of a ground fault of the output of the boosting circuit are thereby limited, and it is thereby possible to reduce the size of the part P1 of the boosting circuit as shown in FIG. 7. Further, the backflow current from the backup capacitor is limited also in the event of short-circuit of the smoothing capacitor in the boosting circuit, and it is thereby possible to reduce the size of the part and prevent the heating and breakdown of the IC chip due to a large current. Further, because the part can be reduced in size, it is possible to incorporate the current limiting unit into the IC (semiconductor device).

Alternative Example 1

Figure 11:
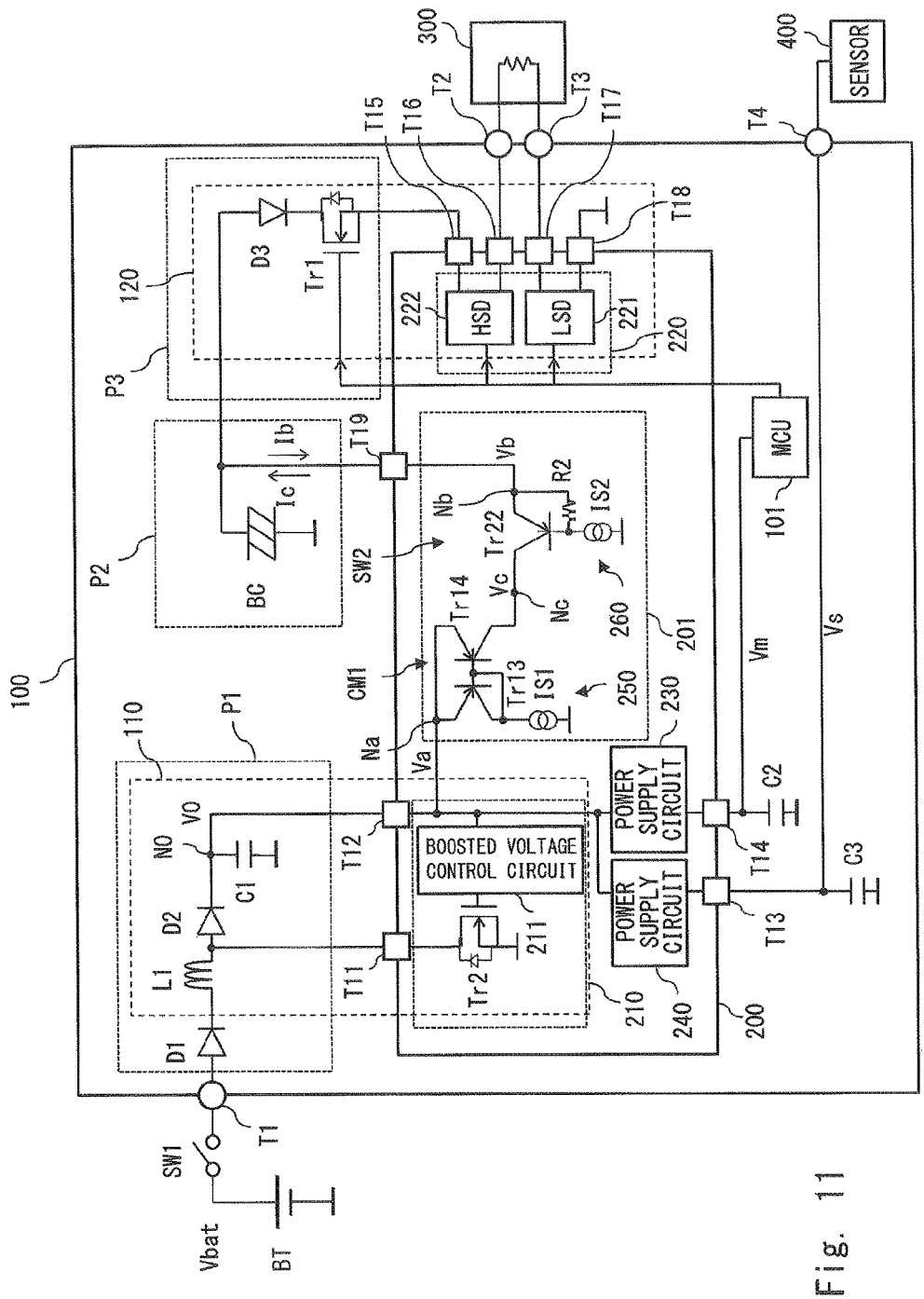
FIG. 11 is a block diagram showing the configuration of an airbag system according to an alternative example 1.

In the first embodiment, the current mirror circuit CM1 of the charging current limiting unit 250 and the switch circuit SW2 of the backflow current limiting unit 260 are formed using PMOS transistors; however, they may be formed using bipolar transistors, not limited to PMOS transistors. FIG. 11 shows the circuit configuration of an alternative example 1 where the charging current limiting unit 250 and the backflow current limiting unit 260 of the ECU 200 according to the first embodiment are modified.

As shown in FIG. 11, in the alternative example 1, the current mirror circuit CM1 of the charging current limiting unit 250 includes PMP bipolar transistors Tr13 and Tr14 in place of the PMOS transistors Tr11 and Tr12 in FIG. 6. The emitters of the bipolar transistor Tr13 and the bipolar transistor Tr14 are connected to the terminal T12. The bases of the bipolar transistor Tr13 and the bipolar transistor Tr14 are connected in common, and a common node between the bases is connected to the collector of the bipolar transistor Tr13. The current source IS1 is connected between the collector of the bipolar transistor Tr13 and the GND.

The switch circuit SW2 includes a PNP bipolar transistor Tr22 in place of the PMOS transistor Tr21 in FIG. 6. The collector of the bipolar transistor Tr22 is connected to a node Nc (collector of the bipolar transistor Tr14), and the emitter of the bipolar transistor Tr22 is connected to the terminal T19. The resistor R2 is connected between the base and the emitter of the bipolar transistor Tr22. The current source IS2 is connected between the base of the bipolar transistor Tr22 and the GND.

As described above, the same characteristics as in FIG. 10 can be obtained when the current mirror circuit CM1 and the switch circuit SW2 are formed using bipolar transistors instead of MOS transistors.

Alternative Example 2

Figure 12:
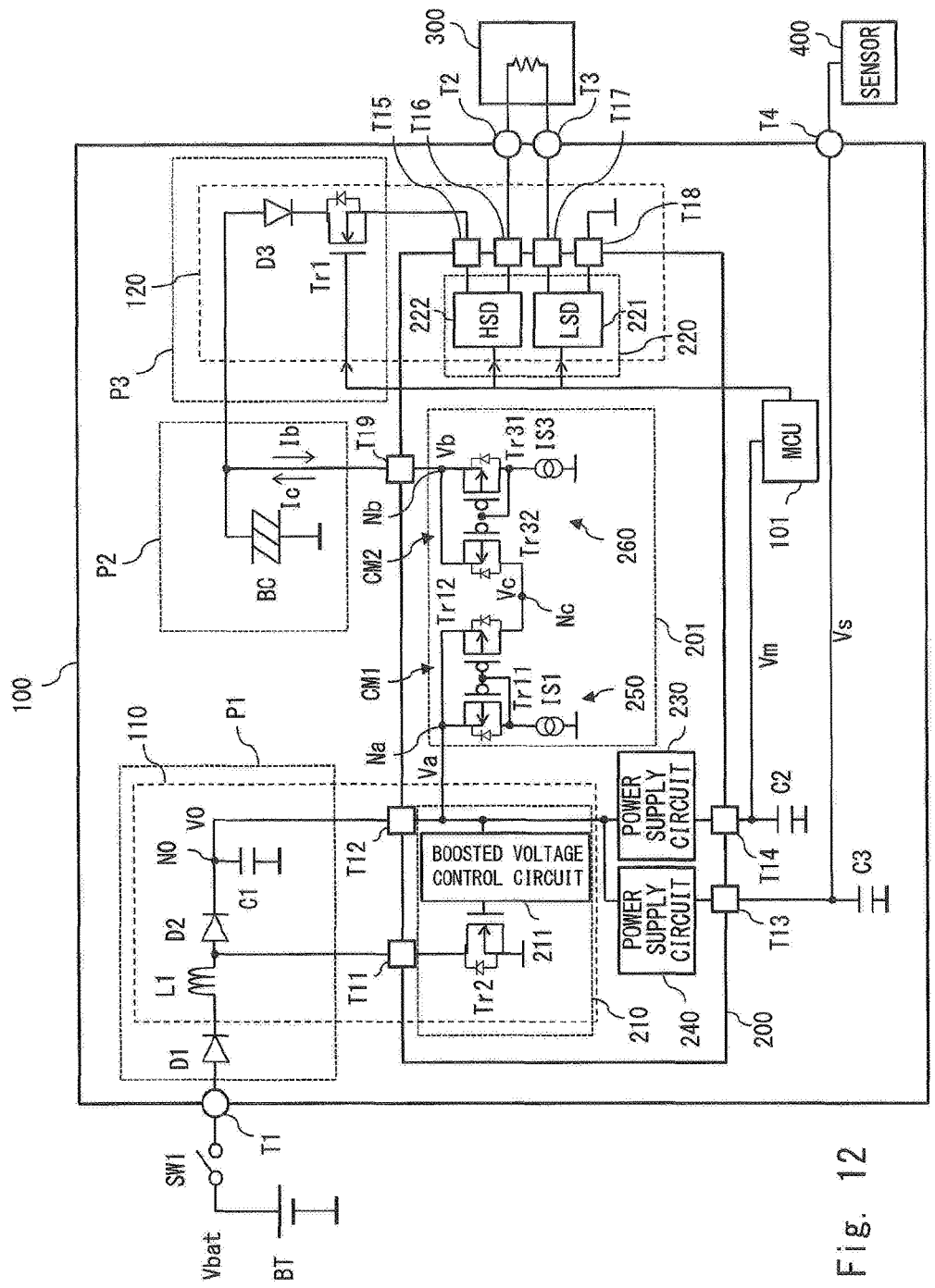
FIG. 12 is a block diagram showing the configuration of an airbag system according to an alternative example 2.

In the first embodiment, the backflow current limiting unit 260 is configured using a switch circuit; however, it may be configured using a current mirror circuit, just like the charging current limiting unit 250. FIG. 12 shows the circuit configuration of an alternative example 2 where the backflow current limiting unit 260 of the ECU 200 according to the first embodiment is modified.

As shown in FIG. 12, in the alternative example 2, the backflow current limiting unit 260 is configured using a current mirror circuit CM2. The current mirror circuit CM2 includes PMOS transistors Tr31 and Tr32 and a current source (reference current source) IS3. Note that the current mirror circuit CM2 may be formed using bipolar transistors as in the alternative example 1.

The PMOS transistor Tr31 and the PMOS transistor Tr32 are connected as a current mirror, and the PMOS transistor Tr31 and the current source IS3 are connected in series. The sources of the PMOS transistor Tr31 and the PMOS transistor Tr32 are connected to the terminal T19. The gates of the PMOS transistor Tr31 and the PMOS transistor Tr32 are connected in common, and a common node between the gates is connected to the drain of the PMOS transistor Tr31. The current source IS3 is connected between the drain of the PMOS transistor Tr31 and the GND.

As described above, the same characteristics as in FIG. 10 can be obtained when the backflow current limiting unit 260 is configured using a current mirror circuit instead of a switch circuit. Specifically, the same characteristics can be achieved by connecting, in series, the current mirror circuit CM1 that can supply the charging current Ic which is needed for charging to the backup capacitor BC and the current mirror circuit CM2 that can supply the backflow current Ib which is needed when the power supply from the battery is cut off.

Alternative Example 3

Figure 13:
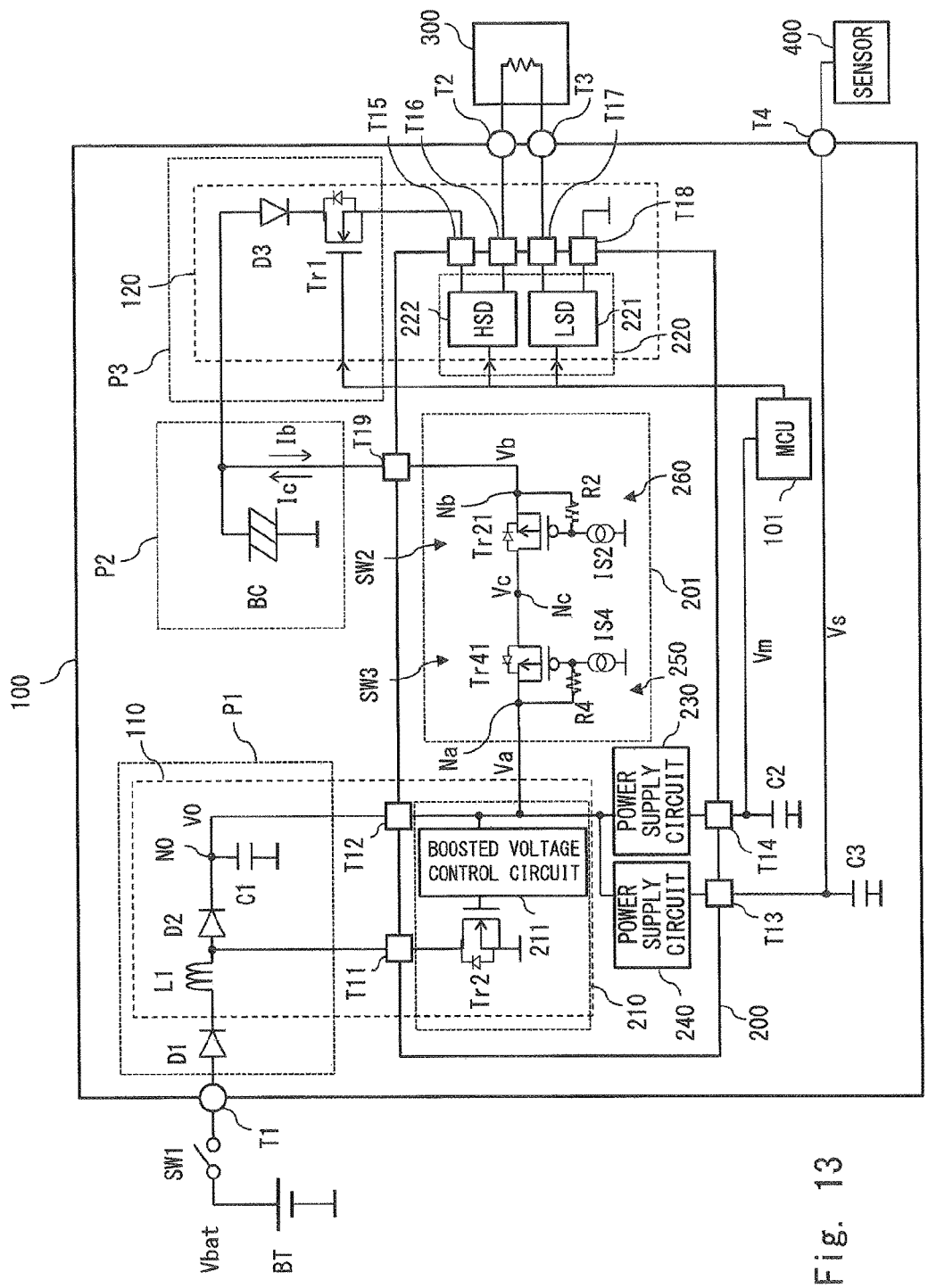
FIG. 13 is a block diagram showing the configuration of an airbag system according to an alternative example 3.

In the third embodiment, the charging current limiting unit 250 is configured using a current mirror circuit; however, it may be configured using a switch circuit, just like the backflow current limiting unit 260. FIG. 13 shows the circuit configuration of an alternative example 3 where the charging current limiting unit 250 of the ECU 200 according to the first embodiment is modified.

As shown in FIG. 13, in the alternative example 3, the charging current limiting unit 250 is configured using a switch circuit SW3. The switch circuit SW3 includes a PMOS transistor Tr41, a resistor R4 and a current source (reference current source) IS4. Note that the switch circuit SW3 may be formed using bipolar transistors as in the alternative example 1.

In the PMOS transistor Tr41, the drain is connected to the node Nc (drain of the PMOS transistor Tr21) and the source is connected to the terminal T12. The resistor R4 is connected between the gate and the source of the PMOS transistor Tr41. The current source IS4 is connected between the gate of the PMOS transistor Tr41 and the GND.

As described above, the same characteristics as in FIG. 10 can be obtained when the charging current limiting unit 250 is configured using a switch circuit instead of a current mirror circuit. Specifically, the same characteristics can be achieved by connecting, in series, the switch circuit SW3 that can supply the charging current Ic which is needed for charging to the backup capacitor BC and the switch circuit SW2 that can supply the backflow current Ib which is needed when the power supply from the battery is cut off.

Second Embodiment

In this embodiment, a voltage diagnosis circuit is connected to the node of the backup capacitor (node of the voltage Vb) in the first embodiment, so that the capacitance of the backup capacitor can be measured.

Figure 14:
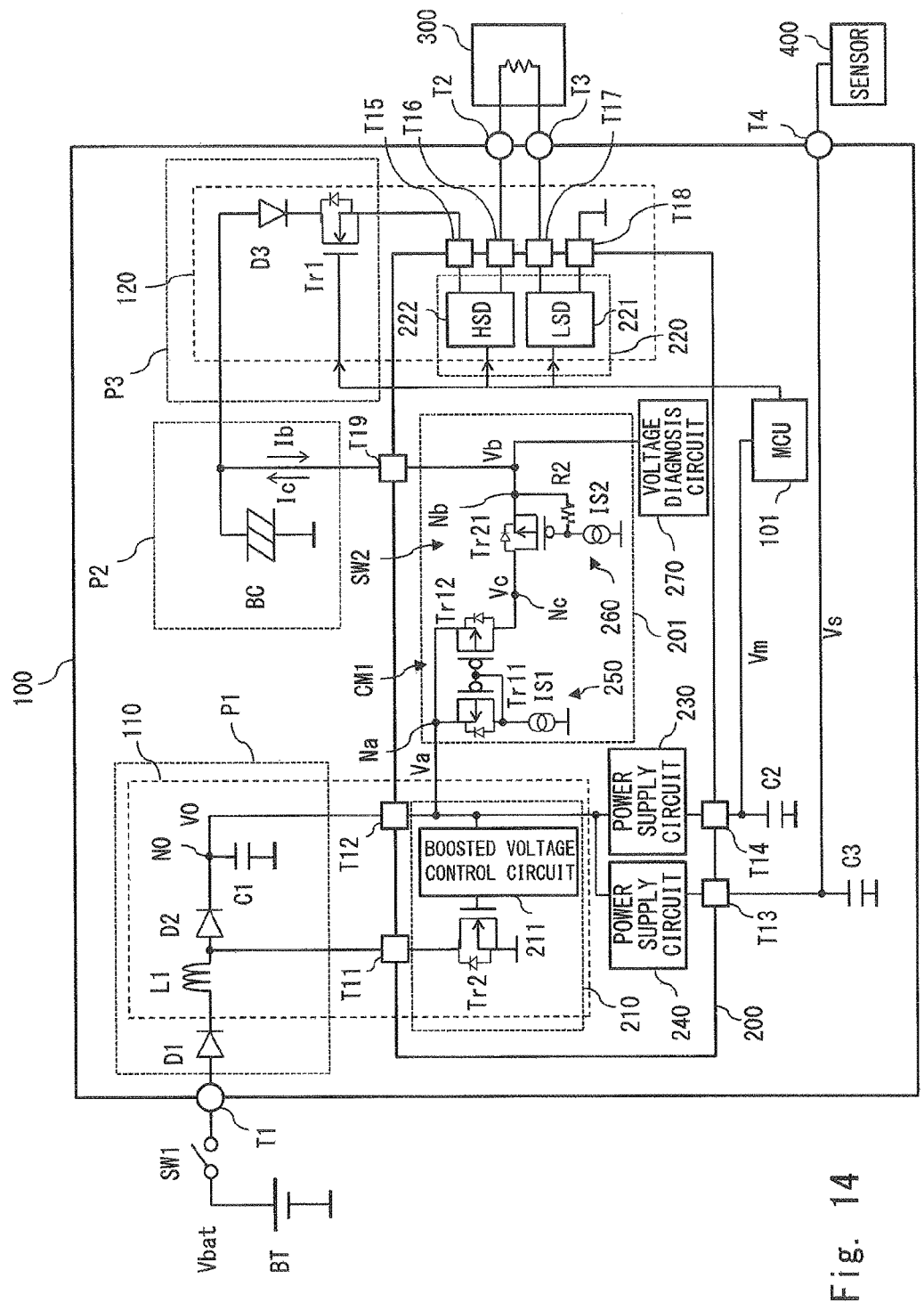
FIG. 14 is a block diagram showing the configuration of an airbag system according to a second embodiment.

FIG. 14 shows the circuit configuration of an IC 200 according to a second embodiment. The IC 200 includes a voltage diagnosis circuit 270 in addition to the elements of the first embodiment shown in FIG. 6, and the other elements are the same as those of the first embodiment. The voltage diagnosis circuit (voltage measurement circuit) 270 is connected to the backup capacitor BC through the terminal T19, and measures (diagnoses) the voltage of the backup capacitor BC in response to a request from the MCU 101 and notifies the measured (diagnosed) voltage to the MCU 101.

As described above, in this embodiment, the voltage diagnosis circuit that diagnoses the voltage of the backup capacitor is included. Because the charging current to the backup capacitor is accurately controlled by the current mirror circuit CM1, the capacitance value can be calculated easily by measuring a voltage difference for a certain period of time during charging, and it is thereby possible to diagnose the abnormality such as the degradation of the backup capacitor.

Third Embodiment

Although the configuration that includes both of the charging current limiting unit that limits the charging current and the backflow current limiting unit that limits the backflow current is described in the first embodiment, only one of them may be included.

Figure 15:
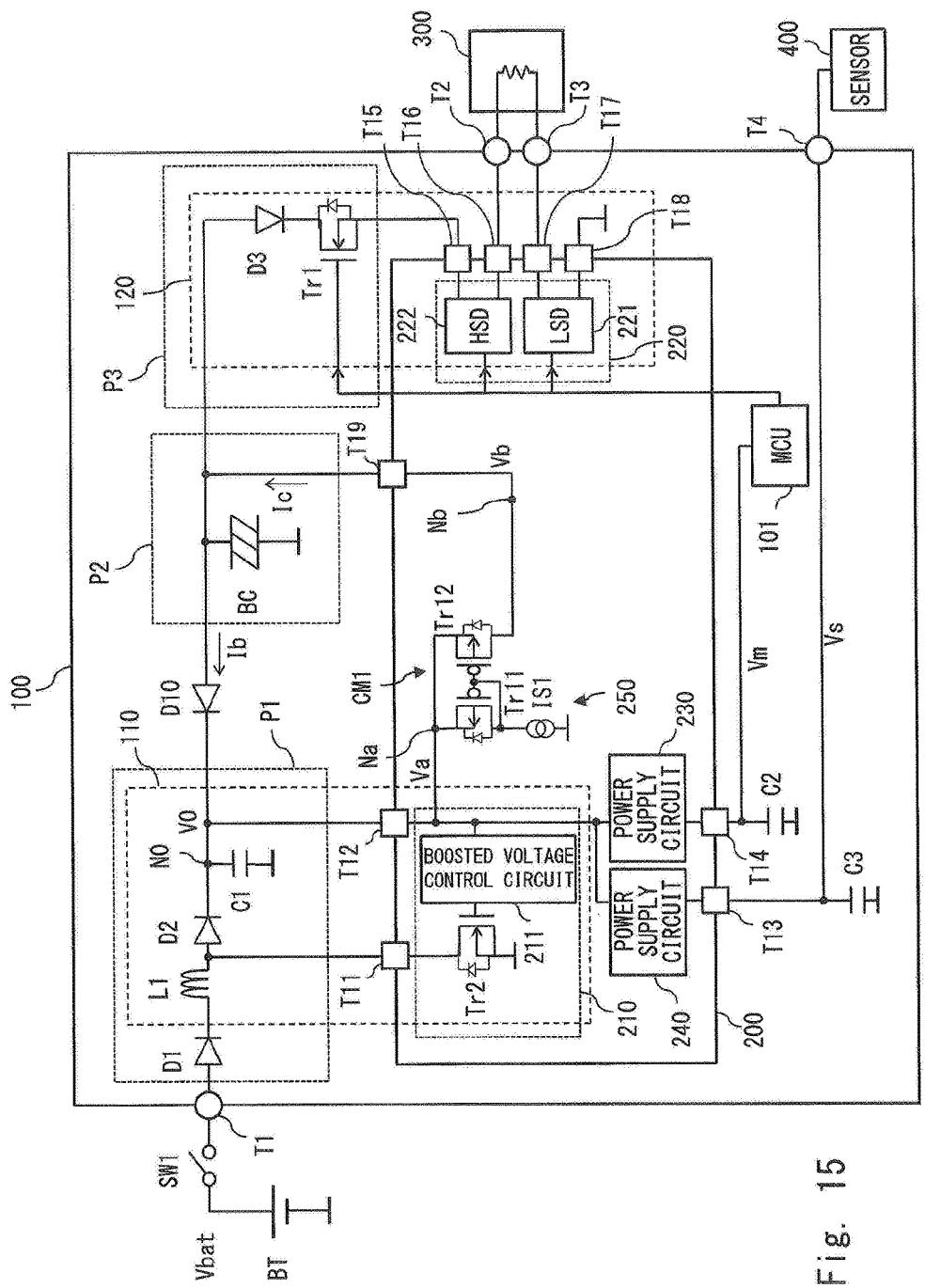
FIG. 15 is a block diagram showing the configuration of an airbag system according to a third embodiment.

FIG. 15 shows one example of the circuit configuration of an IC 200 according to this embodiment. In the example of FIG. 15, the IC 200 includes only the charging current limiting unit 250, and does not include the backflow current limiting unit 260. Further, a diode D10 is placed between the backup capacitor BC and the boosting circuit 110. The other elements are the same as those of the first embodiment.

After the boosting circuit 110 is activated, the boosted voltage V0 of the boosting circuit 110 increases, and the charging current Ic flows to the backup capacitor BC through the current limiting unit by the current mirror circuit CM1. For example, by limiting the charging current Ic to a constant current of about 100 mA, it is possible to reduce the output capacity of the boosting circuit and achieve the size reduction of the part P1.

Further, in the case where a GND short-circuit fault of the terminal T12 occurs after the backup capacitor BC is charged, an overcurrent flows from the backup capacitor BC to the terminal T12 through the diode D10, thereby protecting the PMOS transistor Tr12 of the current mirror circuit CM1.

Figure 16:
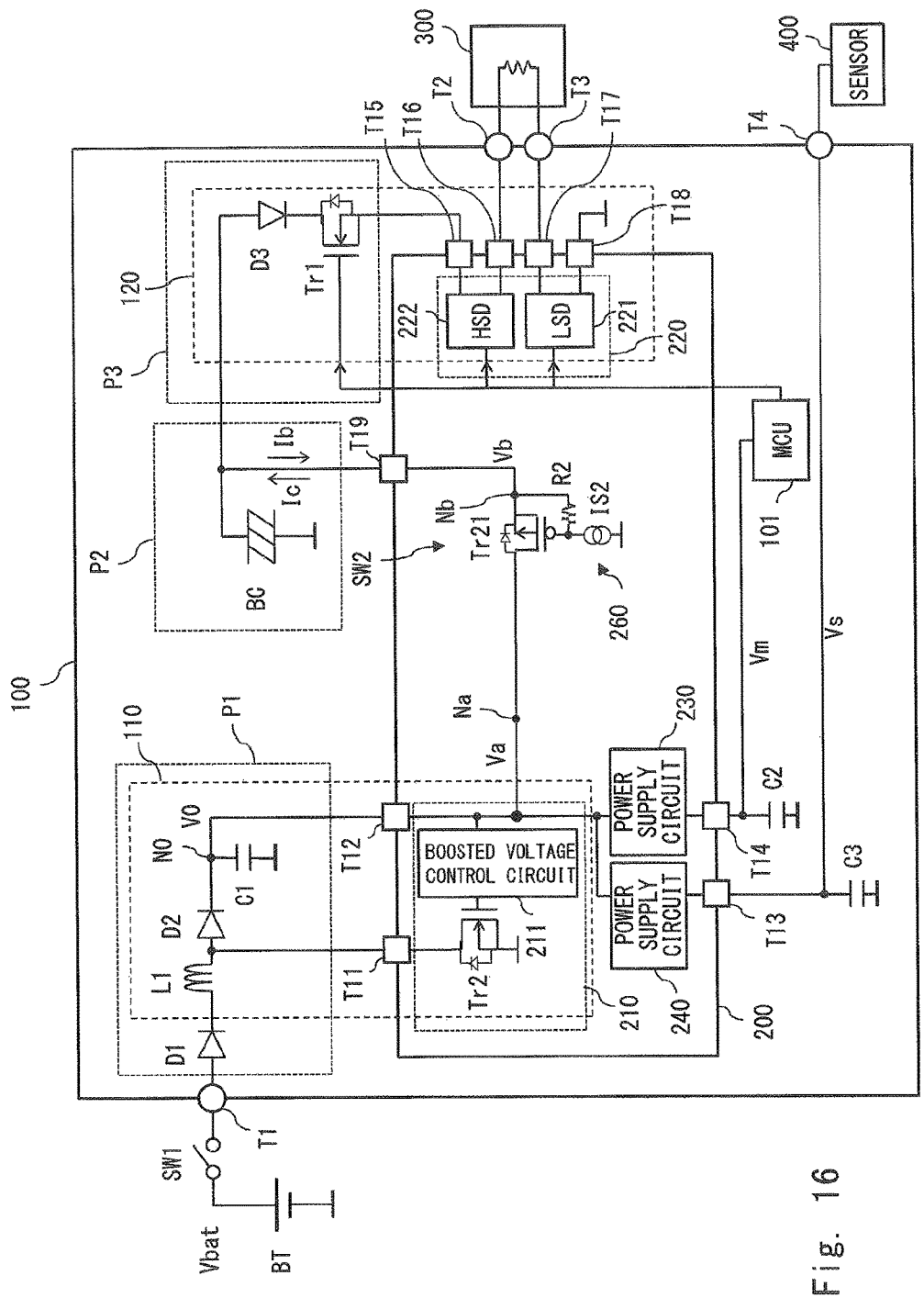
FIG. 16 is a block diagram showing the configuration of an airbag system according to the third embodiment.

FIG. 16 shows another example of the circuit configuration of an IC 200 according to this embodiment. In the example of FIG. 16, only the backflow current limiting unit 260 is included, and the charging current limiting unit 250 is not included. The other elements are the same as those of the first embodiment.

After the boosting circuit 110 is activated, the boosted voltage V0 of the boosting circuit 110 increases, and the charging current Ic flows to the backup capacitor BC through the PMOS transistor Tr21 of the switch circuit SW2. Because the PMOS transistor Tr21 does not have a current limiting function, the boosting circuit 110 needs to have high output current capacity, and it is thus not possible to achieve the size reduction of the part P1.

When the power supply from the battery is cut off, the backflow current Ib flows from the backup capacitor BC to the terminal T12 through the switch circuit SW2. The backflow current Ib is supplied to the circuit to which the voltage V0 of the terminal T12 is supplied, which is the circuit with the current consumption of 200 mA or less, for example, and the current limiting function of a consumed current or more is incorporated as a protection of the PMOS transistor Tr21 when the terminal T12 is short-circuited with the GND, thereby achieving the size reduction of the transistor Tr21.

Although embodiments of the present invention are described specifically in the foregoing, the present invention is not restricted to the above-described embodiments, and various changes and modifications may be made without departing from the scope of the invention.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An airbag control device comprising:
 a boosting circuit that boosts an input power supply voltage;
 a backup capacitor that charges a backup power supply in accordance with a boosted voltage boosted by the boosting circuit;
 an airbag driving circuit that drives an airbag with the charged backup power supply as a driving power supply; and
 a current limiting circuit that limits a charging current flowing from the boosting circuit to the backup capacitor and limits a backflow current flowing from the backup capacitor to the boosting circuit.

2. The airbag control device according to claim 1, wherein the current limiting circuit includes:
 a charging current limiting circuit that limits the charging current to be smaller than a first current; and
 a backflow current limiting circuit that limits the backflow current to be smaller than a second current.

3. The airbag control device according to claim 2, wherein the charging current limiting circuit includes a constant current circuit that is connected between the boosting circuit and the backflow current limiting circuit and generates a constant current in accordance with an input-output voltage of the charging current limiting circuit.

4. The airbag control device according to claim 3, wherein the constant current circuit includes a current mirror circuit that operates as a current mirror in accordance with the input-output voltage.

5. The airbag control device according to claim 3, wherein the constant current circuit includes a transistor circuit that operates in a saturated state in accordance with the input-output voltage.

6. The airbag control device according to claim 2, wherein the backflow current limiting circuit includes a constant current circuit that is connected between the charging current limiting circuit and the backup capacitor and generates a constant current in accordance with an input-output voltage of the backflow current limiting circuit.

7. The airbag control device according to claim 6, wherein the constant current circuit includes a transistor circuit that operates in a saturated state in accordance with the input-output voltage.

8. The airbag control device according to claim 6, wherein the constant current circuit includes a current mirror circuit that operates as a current mirror in accordance with the input-output voltage.

9. The airbag control device according to claim 1, comprising:
 a voltage measurement circuit that measures a voltage between the current limiting circuit and the backup capacitor.

10. The airbag control device according to claim 1, comprising:
 a control circuit that operates with a power supply on a basis of the boosted voltage and controls an operation of the airbag driving circuit.

11. An airbag control device comprising:
 a boosting circuit that boosts an input power supply voltage;
 a backup capacitor that charges a backup power supply for airbag driving in accordance with a boosted voltage boosted by the boosting circuit;
 a current mirror circuit that is connected between the boosting circuit and the backup capacitor and supplies a first current to the backup capacitor based on the boosted voltage; and
 a transistor circuit that is connected between the current mirror circuit and the backup capacitor and supplies a second current from the backup capacitor to the boosting circuit when in a saturated state.

12. The airbag control device according to claim 11, wherein the current mirror circuit includes:
 a first mirror transistor and a current source connected in series to the boosting circuit; and
 a second mirror transistor connected between the boosting circuit and the transistor circuit and connected as a current mirror with the first mirror transistor.

13. The airbag control device according to claim 11, wherein the transistor circuit includes:
 a switch transistor connected between the current mirror circuit and the backup capacitor;
 a resistor connected between a control terminal of the switch transistor and the backup capacitor; and
 a current source connected to the control terminal of the switch transistor.

14. A semiconductor device comprising:
 a first terminal to which a boosted voltage generated by boosting a power supply voltage is input from a boosting element;
 a boosted voltage control circuit that controls a boosted voltage of the first terminal;

a second terminal that outputs the boosted voltage to a backup capacitor that charges a backup power supply for airbag driving; and a current limiting circuit that limits a charging current flowing from the first terminal to the second terminal and limits a backflow current flowing from the second terminal to the first terminal.

15. The semiconductor device according to claim 14, wherein the current limiting circuit includes at least one current source that controls at least one transistor that controls at least one of the charging current and the backflow current.

16. The semiconductor device according to claim 15, wherein at least one of the at least one current source provides current to a current mirror circuit comprising at least two transistors.

17. The semiconductor device according to claim 16, wherein the at least two transistors each comprises a PMOS transistor.

18. The semiconductor device according to claim 16, wherein the at least two transistors each comprises a bipolar transistor.

19. The semiconductor device according to claim 15, wherein the current limiting circuit includes a first current source in a first circuit for limiting the charging current and a second current source in a second circuit for limiting the backflow current.

20. The semiconductor device according to claim 14, wherein the current limiting circuit that limits the backflow current comprises:

a transistor that controls the backflow current;

a constant current source that controls the transistor; and a resistor interconnected between an output terminal of the constant current source and the second terminal.

* * * * *